United States Patent [19]

Eiermann et al.

[11] 4,395,586
[45] Jul. 26, 1983

[54] HOLDING DEVICE FOR ELECTRICAL THIN LAYER RESISTANCE

[75] Inventors: Kurt Eiermann, Pfungstadt; Eberhard Horlebein, Mainaschaff; Wolfgang Schäfer, Frankfurt, all of Fed. Rep. of Germany

[73] Assignee: Degussa AG, Frankfurt, Fed. Rep. of Germany

[21] Appl. No.: 392,478

[22] Filed: Jun. 28, 1982

[30] Foreign Application Priority Data

Jul. 9, 1981 [DE] Fed. Rep. of Germany ....... 3127097

[51] Int. Cl.³ .............................................. H01B 17/56
[52] U.S. Cl. ................................. 174/138 J; 219/536; 219/541; 248/201; 338/315; 339/125 R
[58] Field of Search ............... 338/315, 316, 318, 328, 338/153; 174/138 J; 339/119, 125, 126, 131, 220; 73/189; 219/536–541, 552; 248/158, 201, 309.2; 373/130

[56] References Cited

U.S. PATENT DOCUMENTS

| 3,037,730 | 6/1962 | Knoll et al. | 248/201 |
| 3,812,281 | 5/1974 | Boyer | 339/131 X |
| 3,916,149 | 10/1975 | Skinner | 219/541 X |
| 3,935,376 | 1/1976 | Cooper et al. | 174/138 J |
| 4,168,423 | 9/1979 | Gilreath | 219/536 X |
| 4,247,842 | 1/1981 | Bengsch et al. | 219/536 X |
| 4,250,399 | 2/1981 | King | 219/532 |
| 4,343,530 | 8/1982 | Leger | 339/220 R |

Primary Examiner—Volodymyr Y. Mayewsky
Attorney, Agent, or Firm—Cushman, Darby & Cushman

[57] ABSTRACT

For the secure positioning combined with a quick regulation of the thermal equilibrium of thin layer resistances, especially in hot film anemometers, there are used holding devices in which the thin layer resistance 2 is rested on at least three pointed supports 4 of a holding clamp 1 and is pressed on at least two of the supports 4 with clips provided with spikes.

6 Claims, 2 Drawing Figures

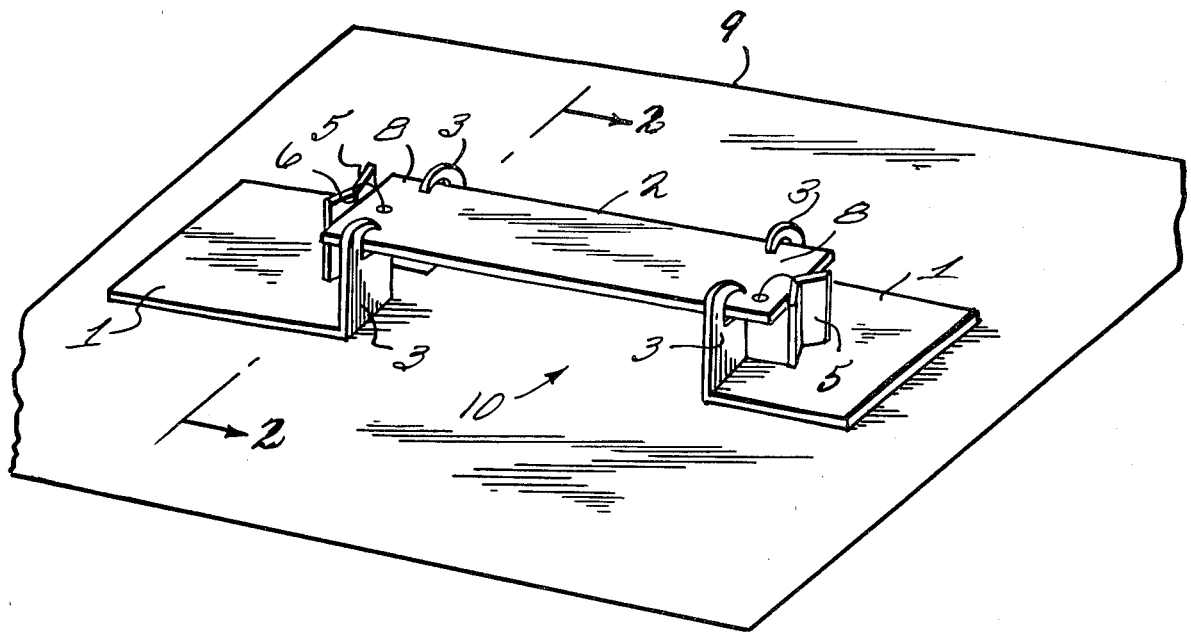
F I G. 1
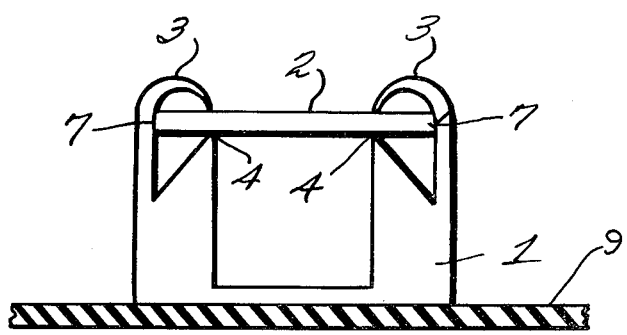
F I G. 2

HOLDING DEVICE FOR ELECTRICAL THIN LAYER RESISTANCE

BACKGROUND OF THE INVENTION

The invention is directed to an apparatus for holding plate shaped electrical thin layer resistances which consist of or consist essentially of a thin metal layer on an electrically insulating carrier, especially for use in hot film anemometers for measuring flow velocity.

Heated thin layer resistances are frequently employed as components of hot film anemometers for measuring the flow velocity of gases and liquids, especially the intake air of internal combustion engines. The holding device for the heated thin layer resistance thereby must satisfy various requirements. On the one hand, the heating of the holder should be as small as possible in order to guarantee that the holder does not contribute to the withdrawal of heat to the fluid, and through this influence increase the response time of the anemometer with sudden change of the flow velocity. On the other hand, the thermal equilibrium between thin layer resistance and holder should be reached as quickly as possible in putting the anemometer into operation. Furthermore, there must be given an exact positioning of the film resistance relative to the flow direction, and the flowing around the thin layer resistance should be influenced as little as possible by the holding device.

There are known various methods to join thin layer resistances laminarly with a carrier body, e.g., by adhesives or solders. However, through this the heat capacity of the carrier body is thermally attached to the thin layer resistance so that the dynamic behavior is greatly damaged.

It is also known to produce the attachment of a thin layer resistance only via the electrical pigtails, which e.g., are welded or bonded to the metal resistance layer. There cannot be produced an exact and certain positioning of the thin layer resistance by this means.

Furthermore, there are known mechanical clamps which are suited for the electrical contacting of thin layer resistances and which also can serve as mechanical holder. These clamps, however, exhibit relatively large contact surfaces with the thin layer resistance so that the thermal equilibrium cannot be reached sufficiently quickly. Besides, an exact and certain positioning is only attainable at very high expense.

Therefore, it was the problem of the invention to develop a device for holding plate shaped electrical thin layer resistances which consist of or consist essentially of a thin metal layer on an electrically insulating carrier, especially for use in hot film anemometers for measuring flow velocities which makes possible an exact and certain positioning, guarantees a very quick establishment of the thermal equilibrium, and only immaterially influences the amount of heat drawn off from the heated thin layer resistance by the flow of fluid.

SUMMARY OF THE INVENTION

This problem was solved according to the invention by resting the thin layer resistance on at least three pointed supports of a holding clamp and pressing it on at least two of the supports with clips provided with spikes. Preferably, the thin layer resistance is additionally fixed to the holding clamp by two tongues and thus additionally secured against movement. There has proven especially good a holding clamp which has four pointed supports with corresponding clips and carries two wedge-shaped tongues. Besides, it is frequently advantageous to construct the holding clamps out of two parts.

A metallic work material is normally used for the holding device. Advantageously, the holding device is constructed as a stamped metal part and thus makes possible even at very small dimensions the maintenance of sufficiently small tolerances to guarantee an exact positioning.

BRIEF DESCRIPTION OF THE DRAWINGS

FIG. 1 is a perspective view showing a complete structure including the layer resistance 2 and the carrier body 9.

FIG. 2 is a sectional view taken along the line 2—2 of FIG. 1.

DETAILED DESCRIPTION

FIG. 1 in perspective shows the complete structure of the holding device made of two identical holding clamp parts 1 as well as a thin layer resistance 2 in the shape of a rectangular small plate. Each of the holding clamp parts 1 has two pointed supports 4, see FIG. 2, and the supports have clips 3 provided with spikes as well as wedge shaped tongues 5.

The four clips 3 are not yet bent before mounting the thin layer resistance 2 so that the thin layer resistance 2 can be laid on the four supports. The positioning in the longitudinal axis of the thin layer resistance takes place through the wedge-shaped tongues 5 provided with edges 6. By bending over the four clips 3, there takes place the fastening of the thin layer resistance 2 to the holding clamp 1.

As shown in FIG. 2, the contact surfaces between the thin layer resistance 2 and the holding clamp 1 are given by the radii of the support points 4, the spikes of the clips 3, as well as by the geometry of the edges 6 on the tongues 5 and the edges 7 of the clips 3.

The preferred manufacture of the holding clamps as stamped metal parts made of a metallic material makes it possible both to form the contact surfaces between the thin layer resistance 2 and the holding clamp 1 very small and also because of the small manufacturing tolerances to guarantee a very exact positioning of the thin layer resistance 2. There is possible through the support surface between the holding clamp parts 1 and a carrier body 9 an exact alignment of the thin layer resistance 2 relative to the carrier body 9 and to the flow direction 10.

The thin layer resistance has at each of its opposite ends a contact surface 8. Advantageously, the electrical contacting of the thin layer resistance takes place through a bonded wire connection between contact surface 8 and tongue 5. The two holding clamp parts 1 in turn are advantageously soldered to the carrier body 9 in order to produce the electrical connection between thin layer resistance and an electronic control circuit. The control circuit controls the current through the heated resistance in such a way that there is obtained a measure for the flow velocity.

The holding device of the invention is likewise very well suited for clamping a thermometer probe, especially for measuring the temperature of a gas stream. Through the good thermal separation of the temperature probe and holder, there are obtained very short response times with temperature changes of the gas.

The entire disclosure of German priority application No. P 3127097.2 is hereby incorporated by reference.

What is claimed is:

1. A device for holding a plate-shaped thin layer electrical resistance of the type where a thin metal layer is carried on an electrically insulating carrier, said device comprising holding clamp means, said holding clamp means including at least three pointed support means and at least two clip means each provided with spikes being arranged to press a thin layer resistance located between said spikes and said support means toward said support means.

2. The device as claimed in claim 1 wherein at least two tongue means are provided for engaging portions of the thin layer electrical resistance.

3. A device according to claim 2 wherein the tongue means are constructed so as to be adapted as contact surfaces for a bonded wire connection.

4. The device as claimed in claim 2 wherein the tongue means are wedge-shaped, each having an edge for engaging a portion of the thin layer electrical resistance, and a fourth pointed support means is provided with each of said four pointed support means having clip means for holding a thin layer electrical resistance in association with a said support means.

5. The device as claimed in claim 1 wherein a carrier body is provided and said clamp means are secured to said carrier body.

6. The device as claimed in claim 4 wherein the carrier body is provided and said clamp means are secured to said carrier body.

* * * * *